United States Patent [19]

D'Sidocky et al.

[11] Patent Number: 6,077,912

[45] Date of Patent: Jun. 20, 2000

[54] RUBBER ARTICLE CONTAINING SODIUM THIOSULFATE PENTAHYDRATE

[75] Inventors: Richard Michael D'Sidocky, Ravenna; David John Zanzig, Uniontown; Shingo Futamura, Wadsworth, all of Ohio

[73] Assignee: The Goodyear Tire & Rubber Company, Akron, Ohio

[21] Appl. No.: 08/985,253

[22] Filed: Dec. 4, 1997

Related U.S. Application Data

[62] Division of application No. 08/734,814, Oct. 22, 1996, Pat. No. 5,728,778, which is a division of application No. 08/526,183, Sep. 11, 1995, Pat. No. 5,616,655.

[51] Int. Cl.$^7$ .................................................. C08C 19/20
[52] U.S. Cl. ........................................ 525/332.6; 152/564
[58] Field of Search ........................... 525/329.3, 330.4, 525/330.9, 331.8, 332.6; 152/564

[56] References Cited

U.S. PATENT DOCUMENTS

| | | | |
|---|---|---|---|
| 4,003,843 | 1/1977 | Kempermann | 525/342 |
| 5,087,668 | 2/1992 | Sandstrom | 525/237 |
| 5,534,599 | 7/1996 | Sandstrom | 525/342 |
| 5,594,052 | 1/1997 | D'Sidocky | 524/83 |
| 5,616,655 | 4/1997 | D'Sidocky | 525/342 |
| 5,844,044 | 12/1998 | Sandstrom | 525/237 |

OTHER PUBLICATIONS

Nikitin, Vulcanization of Nitrile Rubbers by Sulfides and Thiolsulfates of Alkali and Alkaline Earth Metals, International Polymer and Science Technology, vol. 2, No. 6 (1975).

Ephriam, F., Inorganic Chemistry, pp. 579–585 (1954).

*Primary Examiner*—Christopher A. Henderson, Jr.
*Attorney, Agent, or Firm*—Bruce J Hendricks

[57] ABSTRACT

A method is disclosed for processing a rubber composition comprising thermomechanically mixing at a rubber temperature in a range of 140° C. to 190° C. for a mixing time of 1 to 20 minutes (i) 100 parts by weight of at least one sulfur vulcanizable elastomer selected from conjugated diene homopolymers and copolymers, natural rubber and copolymers of at least one conjugated diene and aromatic vinyl compound;

(ii) 10 to 250 phr of particulate precipitated silica;

(iii) 0.01 to 1.0 parts by weight per weight of said silica of an organosilicon compound; and (iv) 0.05 to 10 phr of sodium thiosulfate pentahydrate.

Addition of the sodium thiosulfate pentahydrate to sulfur vulcanizable rubber, silica and sulfur containing organosilicon compound decreases the mixing/processing time without sacrificing end product properties.

6 Claims, No Drawings

RUBBER ARTICLE CONTAINING SODIUM THIOSULFATE PENTAHYDRATE

This is a Divisional of application Ser. No. 08/734,814, filed on Oct. 22, 1996, now U.S. Pat. No. 5,728,778, which claims the benefit and is a Divisional of application Ser. No. 08/526,183, filed on Sep. 11, 1995, now U.S. Pat. No. 5,616,655.

FIELD OF THE INVENTION

The present invention relates to a sulfur vulcanizable rubber containing an organosilicon compound and sodium thiosulfate pentahydrate and the processing of a sulfur curable rubber composition containing a sulfur containing organosilicon compound and sodium thiosulfate pentahydrate.

BACKGROUND OF THE INVENTION

U.S. Pat. No. 5,227,425 teaches a thermomechanical working of a sulfur vulcanizable rubber composition containing 30 to 150 phr of silica. The thermomechanical step comprises reaching a temperature of between 130° C. to 180° C. for a time period between 10 seconds to 20 minutes followed by addition of the vulcanization system at a lower temperature. It is believed that the thermal treatment during mixing promotes the sulfur linkages in the sulfur containing organosilicon compound to cleave forming bonds to the rubber and concomitant reaction of the alkoxy groups with the silica. Unfortunately, this thermal treatment requires undesirably long mixing/reaction times. Therefore, there exists a need for improved methods which enhance the rate of processing in the absence of undesirable properties of the vulcanizate.

SUMMARY OF THE INVENTION

The present invention relates to the use of silica, a sulfur containing organosilicon compound and sodium thiosulfate pentahydrate in a sulfur vulcanizable rubber.

DETAILED DESCRIPTION OF THE INVENTION

There is disclosed a method for processing a rubber composition which comprises thermomechanically mixing at a rubber temperature in a range of from 140° C. to 190° C. for a mixing time of 1 to 20 minutes (i) 100 parts by weight of at least one sulfur vulcanizable elastomer selected from conjugated diene homopolymers and copolymers and from copolymers of at least one conjugated diene and aromatic vinyl compound;

(ii) 10 to 250 phr of particulate precipitated silica;

(iii) 0.01 to 1.0 parts by weight per part by weight of said silica of an organosilicon compound of the formula:

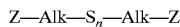

in which Z is selected from the group consisting of

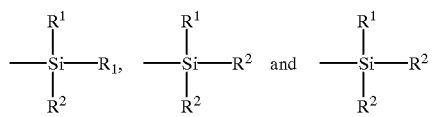

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8;

(iv) 0.05 to 10 phr of sodium thiosulfate pentahydrate.

There is also disclosed a sulfur vulcanizable composition comprising an elastomer containing olefinic unsaturation, a sulfur containing organosilicon compound, silica and sodium thiosulfate pentahydrate.

The present invention may be used to process sulfur vulcanizable rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50%. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90% cis 1,4-content.

The cis 1,4-polyisoorene and cis 1,4-polyisoprene natural rubber are well known to those having skill in the rubber art.

The term "phr" as used herein, and according to conventional practice, refers to "parts by weight of a respective material per 100 parts by weight of rubber, or elastomer".

The sodium thiosulfate pentahydrate used in the present invention may be added to the rubber by any conventional technique such as on a mill or in a Banbury. The amount of sodium thiosulfate pentahydrate may vary widely depending on the type of rubber and other compounds present in the vulcanizable composition. Generally, the amount of sodium thiosulfate pentahydrate is used in a range of from about 0.05 to about 10.0 phr with a range of 0.1 to about 5.0 phr being preferred. This material should be added in the nonproductive stage with the silica and coupling agent.

For ease in handling, the sodium thiosulfate pentahydrate salt may be used per se or may be deposited on suitable carriers. Examples of carriers which may be used in the present invention include silica, carbon black, alumina, kieselguhr, silica gel and calcium silicate.

The processing of the sulfur vulcanizable rubber is conducted in the presence of a sulfur containing organosilicon compound. Examples of suitable sulfur containing organosilicon compounds are of the formula:

$$Z-Alk-S_n-Alk-Z \qquad (I)$$

in which Z is selected from the group consisting of

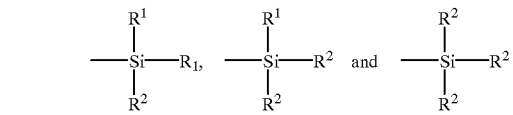

where
  $R^1$ is an alkyl group of 1 to 4 carbon atoms, cyclohexyl or phenyl;
  $R^2$ is alkoxy of 1 to 8 carbon atoms, or cycloalkoxy of 5 to 8 carbon atoms;
  Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxysilylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis (triethoxysilylpropyl) tetrasulfide. Therefore as to formula I, preferably Z is

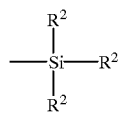

where
R² is an alkoxy of 2 to 4 carbon atoms, with 2 carbon atoms being particularly preferred;
Alk is a divalent hydrocarbon of 2 to 4 carbon atoms with 3 carbon atoms being particularly preferred; and
n is an integer of from 3 to 5 with 4 being particularly preferred.

The amount of the sulfur containing organosilicon compound of formula I in a rubber composition will vary depending on the level of silica that is used. Generally speaking, the amount of the compound of formula I will range from 0.01 to 1.0 parts by weight per part by weight of the silica. Preferably, the amount will range from 0.05 to 0.4 parts by weight per part by weight of the silica.

In addition to the sulfur containing organosilicon, the rubber composition should contain a sufficient amount of silica, and carbon black, if used, to contribute a reasonably high modulus and high resistance to tear. The silica filler may be added in amounts ranging from 10 to 250 phr. Preferably, the silica is present in an amount ranging from 15 to 80 phr. If carbon black is also present, the amount of carbon black, if used, may vary. Generally speaking, the amount of carbon black will vary from 0 to 80 phr. Preferably, the amount of carbon black will range from 0 to 40 phr. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation.

Where the rubber composition contains both silica and carbon black, the weight ratio of silica to carbon black may vary. For example, the weight ratio may be as low as 1:5 to a silica to carbon black weight ratio of 30:1. Preferably, the weight ratio of silica to carbon black ranges from 1:3 to 5:1. The combined weight of the silica and carbon black, as herein referenced, may be as low as about 30 phr, but is preferably from about 45 to about 90 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Typical amounts of reinforcing type carbon blacks(s), for this invention, if used, are herein set forth. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The most preferred sulfenamides are compounds of the general formula:

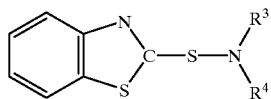

wherein
$R^3$ is selected from the group consisting of hydrogen, acyclic aliphatic groups having from about 1 to 10 carbon atoms, and cyclic aliphatic groups having from about 5 to 10 carbon atoms; and
$R^4$ is selected from the group consisting of cyclic aliphatic groups having from about 5 to 10 carbon atoms and a mercaptobenzothiazolyl group of the formula:

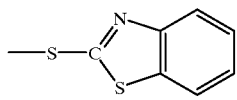

Representative of the sulfenamide compounds of the above formula and which may be used in the present invention include N-cyclohexyl-2-benzothiazylsulfenamide, N-t-butyl-2-benzothiazylsulfenamide, N,N-dicyclohexyl-2-benzothiazylsulfenamide, N-isopropyl-2-benzothiazylsulfenamide, and N-t-butylbis-(2-benzothiazylsulfen)amide. Preferably, the sulfenamide compound is N-cyclohexyl-2-benzothiazylsulfenamide.

The above accelerators and in particular the sulfenamides may be added to the rubber, silica, organosilicon compound and sodium thiosulfate pentahydrate during the thermomechanical mixing.

The rubber compositions of the present invention may contain a methylene donor and a methylene acceptor. The term "methylene donor" is intended to mean a compound capable of reacting with a methylene accepted (such as resorcinol or its equivalent containing a present hydroxyl group) and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

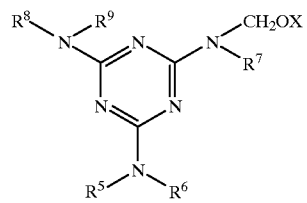

wherein
X is an alkyl having from 1 to 8 carbon atoms,
$R^5$, $R^6$, $R^7$, $R^8$ and $R^9$ are individually selected from the group consisting of hydrogen, an alkyl having from 1 to 8 carbon atoms and the group —$CH_2OX$.

Specific methylene donors include hexakis(methoxymethyl) melamine, N,N',N"-trimethyl/N,N',N"-trimethylolmelamine, hexamethylolmelamine, N,N', N"-dimethylolmelamine, N-methylolmelamine, N,N'-dimethylolmelamine, N,N',N"-tris(methoxymethyl) melamine and N,N'N"-tributyl-N,N',N"-trimethylolmelamine. The N-methylol derivatives of melamine are prepared by known methods.

The amount of methylene donor and methylene acceptor that is present in the rubber stock may vary. Typically, the amount of methylene donor and methylene acceptor that each is present will range from about 0.1 phr to 10.0 phr. Preferably, the amount of methylene donor and methylene acceptor that each is present ranges from about 2.0 phr to 5.0 phr.

The weight ratio of methylene donor to the methylene acceptor may vary. Generally speaking, the weight ratio will range from about 1:10 to about 10:1. Preferably, the weight ratio ranges from about 1:3 to 3:1.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber, silica and sulfur containing organosilicon, sodium thiosulfide and carbon black if used, are mixed in one or more non-productive mix stages. The terms "non-productive" and "productive" mix stages are well known to those having skill in the rubber mixing art. The sulfur vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The invention may be better understood by reference to the following examples in which the parts and percentages are by weight unless otherwise indicated.

EXAMPLE I

In this example, sodium thiosulfate pentahydrate is evaluated in combination with a silica coupling agent, namely, bis-(3-triethoxysilylpropyl)tetrasulfide and silica-reinforced rubber composition.

Rubber compositions containing the materials set out in Tables 1 and 2 were prepared in a BR Banbury™ mixer using two separate stages of addition (mixing), namely, one non-productive mix stage and one productive mix stage. The mixing time and rubber temperatures for the nonproductive was varied and is listed in Table 2. The mixing time for the productive was to a rubber temperature of 120° C. for 2 minutes. The amount of sodium thiosulfate pentahydrate is listed as being "variable" in Table 1 and is more specifically set forth in Table 2.

The rubber compositions are identified herein as Samples 1–9. Samples 1–4 are considered herein as being controls without the use of sodium thiosulfate pentahydrate added during the nonproductive mixing stage.

The samples were cured at about 150° C. for about 18 minutes.

Table 2 illustrates the behavior and physical properties of the cured samples 1–9.

It is clearly evident from the results that the sodium thiosulfide pentahydrate in combination with the silica and coupling agent results in higher modulus and hardness properties.

This is considered an advantage because it suggests that rubber properties equivalent to those achieved when utilizing the organosilane coupler in the rubber/silica mixture might be achieved with less of the organosilane coupler and/or using less mixing time in the internal rubber mixer.

TABLE 1

| Non-Productive | |
|---|---|
| Polybutadiene[1] | 30.0 |
| SBR[2] | 70.0 |
| Waxes[3] | 3.50 |
| Zinc Oxide | 3.5 |
| Fatty Acid | 2.00 |
| Silica[4] | 70.0 |
| Bis-(3-triethoxysilylpropyl) tetrasulfide[5] | 11.00 |
| Antidegradant[6] | 1.0 |
| Antidegradant[7] | 1.0 |
| Sodium thiosulfate pentahydrate | variable |
| Productive | |
| Sulfur | 1.40 |
| Accelerator[8] | 1.70 |
| Accelerator[9] | 2.00 |

[1]synthetic cis 1,4-polybutadiene from The Goodyear Tire & Rubber Company and identified as Budene ® 1207
[2]solution polymerized styrene-butadiene rubber having a bound styrene content of 12 percent by weight and a 46 percent by weight vinyl content obtained from The Goodyear Tire & Rubber Company under the designation Solflex ® 1216
[3]microcrystalline/paraffinic waxes
[4]silica obtained as Zeosil 1165MP from Rhone-Poulenc;
[5]obtained as bis-(3-triethoxysilylpropyl)tetrasulfide, commercially available as X50S from Degussa GmbH which is provided in a 50/50 blend with carbon black and, thus, considered as being 50 percent active when the blend is considered; and
[6]of the polymerized 1,2-dehydro-2,2,4-trimethyldehydroquinoline type;
[7]N-1,3-dimethyl butyl N' phenyl paraphenylene diamine
[8]N-cyclohexyl-2-benzothiazole sulfenamide
[9]diphenyl guanidine

TABLE 2

| Samples | 1 | 2 | 3 | 4 | 5 | 6 | 7 | 8 | 9 |
|---|---|---|---|---|---|---|---|---|---|
| Mix Time and Temperature | 7' @ 160 C. | 5' @ 160 C. | 3' @ 160 C. | 1' @ 160 C. | 5' @ 160 C. | 3' @ 160 C. | 1' @ 160 C. | 3' @ 160 C. | 1' @ 160 C. |
| Sodium Thiosulfate Pentahydrate | 0 | 0 | 0 | 0 | 1 | 1 | 1 | 0.5 | 2.5 |
| Stress Strain 18'/150 C. | | | | | | | | | |
| 100% M (MPa) | 2.08 | 2.18 | 2.16 | 2.22 | 2.36 | 2.33 | 2.33 | 2.4 | 2.52 |
| 300% M (MPa) | 9.18 | 9.04 | 8.22 | 7.76 | 9.96 | 9.10 | 8.95 | 8.53 | 9.32 |
| Tensile Strength (MPa) | 17.4 | 17.45 | 16.02 | 16.82 | 15.08 | 16.03 | 15.84 | 15.33 | 14.76 |
| Elongation @ Break (%) | 499 | 512 | 526 | 556 | 430 | 486 | 488 | 509 | 461 |
| 300%/100% | 4.41 | 4.15 | 3.81 | 3.50 | 4.22 | 3.90 | 3.55 | 3.84 | 3.70 |
| 300%/100% increase vs control @ same time | | | | | | +0.09 | +0.05 | +0.03 | +0.20 |
| Hardness | | | | | | | | | |

TABLE 2-continued

| Samples | 1 | 2 | 3 | 4 | 5 | 6 | 7 | 8 | 9 |
|---|---|---|---|---|---|---|---|---|---|
| RT | 63.4 | 65 | 67.7 | 70.1 | 67.5 | 69.3 | 69.3 | 72.1 | 73 |
| 100 C. | 58.2 | 60.1 | 61.5 | 64 | 61.9 | 63.5 | 63.5 | 65.7 | 66.7 |
| Rebound | | | | | | | | | |
| RT | 46.7 | 45.5 | 43.3 | 41.7 | 45.4 | 44.1 | 43 | 42.4 | 42.7 |
| 100 C. | 66.7 | 65.7 | 63.4 | 60.7 | 65.1 | 63.4 | 62.6 | 61.9 | 62.3 |

EXAMPLE II

In this example, sodium thiosulfate pentahydrate is evaluated in combination with an organosilicon compound, silica and a sulfenamide in the nonproductive. Rubber compositions containing the materials set out in Table 3 and 4 were prepared in a BR Banbury™ mixer using two separate stages of addition (mixing, namely one non-productive mix stage and one productive mix stage. The mixing time and rubber temperatures for the nonproductive was varied and is listed in Table 4. The mixing time for the productive was to a rubber temperature of 120° C. for 2 minutes. The sodium thiosulfate and various accelerators are listed as being "variable" in Table 3 and is more specifically set forth in Table 4.

TABLE 3

| Non-Productive | |
|---|---|
| SBR Rubber[1] | 34.38 |
| Polybutadiene[2] | 20.00 |
| Natural Rubber | 10.00 |
| Isoprene/Butadiene Copolymer[3] | 45.00 |
| Silica[4] | 83.00 |
| Organosilicon Compound[5] | 13.28 |
| Processing Oil and Wax | 15.50 |
| Zinc Oxide | 2.50 |
| Fatty Acid | 3.00 |
| Antidegradant[6] | 2.00 |
| Sodium Thiosulfate Pentahydrate | Varied |
| N-cyclohexyl benzothiazole-2-sulfenamide | Varied |
| Productive | |
| N-cyclohexyl benzothiazole-2-sulfenamide | 1.82 |
| N-cyclohexylthiophiholimide | .10 |
| diarylphenylenediamine | 1.00 |
| diphenyl guanidine | Varied |
| sulfur | 1.4 |

[1] emulsion polymerized styrene/butadiene copolymer rubber with 37 phr aromatic oil and 40 percent styrene and, based on 100 parts by weight thereof, it is composed of 100 parts by weight rubber and 37.5 parts by weight aromatic oil; from The Goodyear Tire & Rubber Company
[2] cis 1,4-polybutadiene rubber from The Goodyear Tire & Rubber Company under designation Budene ® 1207
[3] copolymer of isoprene and butadiene containing 50 percent by weight isoprene and 50 percent by weight butadiene having a glass transition temperature (Tg) of −45° C.
[4] Zeosil MP1165
[5] obtained as bis-(3-triethoxysilylpropyl) tetrasulfide, commercially available as X50S from Degussa GmbH which is provided in a 50/50 blend with carbon black and, thus, considered as being 50 percent active when the blend is considered; and
[6] N-1,3-dimethyl butyl N' phenyl paraphenylene diamine

TABLE 4

| Samples | 10 | 11 | 12 | 13 | 14 |
|---|---|---|---|---|---|
| Mix Time @ 160° C. | 3.5' | 3.5' | 3.5' | 3.5' | 3.5' |
| Sodium Thiosulfate Pentahydrate | 0 | 4 | 4 | 4 | 1.0 |
| N-cyclohexyl benzothiazole-2-sulfenamide (NP) | 0 | 0 | 0 | 0 | 0.50 |
| Diphenyl guanidine (P) | 2 | 2 | 1.5 | 1 | 2.0 |
| Stress Strain | | | | | |
| M100, MPa | 2.65 | 3.10 | 2.76 | 2.63 | 3.27 |
| M300, MPa | 11.21 | 13.86 | 12.45 | 11.82 | 14.10 |
| M300/M100 | 4.23 | 4.47 | 4.51 | 4.49 | 4.31 |
| Brk Str, MPa | 17.3 | 17.2 | 17.3 | 16.8 | 16.6 |
| EL-Brk, % | 470 | 391 | 427 | 433 | 381 |
| Hardness | | | | | |
| RT | 75.7 | 77.1 | 75.5 | 76.2 | 75.9 |
| 100° C. | 69.4 | 70.9 | 68.7 | 69.2 | 70.8 |
| Rebound | | | | | |
| RT | 35.6 | 35.6 | 35.1 | 36.4 | 36.9 |
| 100° C. | 58.4 | 59.8 | 59.9 | 58.4 | 61.5 |

The rubber compositions of this example are identified herein as Samples 10–14. Sample 10 is considered herein as being a control without the use of sodium thiosulfate pentahydrate added during the nonproductive stage. The samples were cured at 150° C. for 18 minutes. Table 4 illustrates the behavior and physical properties of the cured samples 10–14. It is clearly evident that when sodium thiosulfate pentahydrate is added to control sample 10 containing silica and coupling agent to give sample 11 a higher modulus is obtained (11.21 MPa versus 13.86 MPa, respectively) as well as greater M300/M100 ratio (4.23 versus 4.47, respectively). Samples 11, 12 and 13 in which diphenyl guanidine is gradually reduced respectively from 2.0 phr to 1.5 phr to 1.0 phr while maintaining the sodium thiosulfate pentahydrate level at 4.0 phr illustrates that high modulus values and high M300/M100 ratios are still maintained compared to control sample 10. This is a desirable result since it allows less dependence on diphenyl guanidine to achieve comparable performance properties. Sample 14 illustrates that a high modulus value and high M300/M100 ratio can be maintained with the use of lower sodium thiosulfate pentahydrate levels by the addition of a sulfenamide accelerator.

While certain representative embodiments and details have been shown for the purpose of illustrating the invention, it will be apparent to those skilled in this art that various changes and modifications may be made therein without departing from the spirit or scope of the invention.

What is claimed is:

1. An article of manufacture selected from the group consisting of a tire, belt and hose and comprising a rubber composition prepared by a method of processing a rubber composition which includes at least one nonproductive stage and a productive stage wherein the nonproductive stage includes thermomechanically mixing at a rubber temperature in a range of 140° C. to 190° C. for a mixing time of 1 to 20 minutes
    (i) 100 parts by weight of at least one sulfur vulcanizable elastomer selected from conjugated diene homopolymers and copolymers and from copolymers of at least one conjugated diene and aromatic vinyl compound;
(ii) 10 to 250 phr of particulate precipitated silica;
(iii) 0.01 to 1.0 parts by weight per part by weight of said silica of an organosilicon compound of the formula

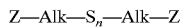

in which Z is selected from the group consisting of

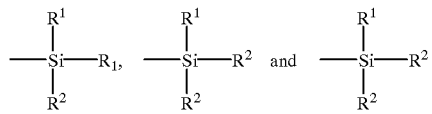

where
$R^1$ is an alkyl group of 1 to 4 carbon atoms, cyclohexyl or phenyl;
$R^2$ is alkoxy of 1 to 8 carbon atoms, or cycloalkoxy of 5 to 8 carbon atoms;
Alk is a divalent hydrocarbon of 1 to 18 carbon atoms and n is an integer of 2 to 8; and
(iv) 0.05 to 10 phr of sodium thiosulfate pentahydrate and the productive stage includes addition of 0.5 to 8 phr of the sulfur vulcanizing agent.

2. The sulfur-vulcanized rubber composition of claim 1 in the form of a tire.

3. The sulfur-vulcanized rubber composition of claim 2 wherein said rubber composition is in the tread.

4. The composition of claim 2 wherein said sodium thiosulfate pentahydrate is present in an amount ranging from 0.05 to 10.0 phr.

5. The composition of claim 2 wherein sulfur containing organosilicon compound is present in an amount ranging from 0.01 to 0.2 parts by weight per part by weight of said silica.

6. The composition of claim 2 wherein said sulfur vulcanizable rubber is an elastomer containing olefinic unsaturation and is selected from the group consisting of natural rubber, neoprene, polyisoprene, butyl rubber, polybutadiene, styrene-butadiene copolymer, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

* * * * *